United States Patent
Wiszniewski et al.

(10) Patent No.: US 9,093,883 B2
(45) Date of Patent: Jul. 28, 2015

(54) METHOD AND APPARATUS FOR CHECKING A SPEED SYSTEM OF A MOTOR-DRIVEN APPARATUS

(71) Applicant: Robert Bosch GmbH, Stuttgart (DE)

(72) Inventors: Jacek Wiszniewski, Leinfelden-Echterdingen (DE); Kamil Pogorzelski, Stuttgart (DE); Daniel Rombach, Metzingen (DE)

(73) Assignee: Robert Bosch GmbH, Stuttgart (DE)

( * ) Notice: Subject to any disclaimer, the term of this patent is extended or adjusted under 35 U.S.C. 154(b) by 113 days.

(21) Appl. No.: 13/859,398

(22) Filed: Apr. 9, 2013

(65) Prior Publication Data

US 2013/0271053 A1    Oct. 17, 2013

(30) Foreign Application Priority Data

Apr. 12, 2012   (DE) .................. 10 2012 205 973

(51) Int. Cl.
| | |
|---|---|
| *G01R 31/02* | (2006.01) |
| *H02H 3/04* | (2006.01) |
| *H02H 7/08* | (2006.01) |
| *H02K 11/00* | (2006.01) |
| *G01P 21/02* | (2006.01) |
| *G05B 9/02* | (2006.01) |

(52) U.S. Cl.
   CPC ............ *H02K 11/0015* (2013.01); *G01P 21/02* (2013.01); *G05B 9/02* (2013.01); *H02K 11/001* (2013.01)

(58) Field of Classification Search
   CPC .............................. G05B 9/02; H02K 11/001
   USPC ........................................................ 318/490
   See application file for complete search history.

(56) References Cited

U.S. PATENT DOCUMENTS

| | | | |
|---|---|---|---|
| 5,459,732 A | 10/1995 | Wise et al. | |
| 5,633,797 A | 5/1997 | Hornback | |
| 7,058,490 B2* | 6/2006 | Kim | 701/33.9 |
| 7,082,358 B2* | 7/2006 | Sugo | 701/34.3 |
| 7,178,412 B2 | 2/2007 | Nallapa | |
| 7,279,862 B1* | 10/2007 | Welchko et al. | 318/564 |
| 8,397,569 B2* | 3/2013 | Kuroda et al. | 73/504.12 |
| 2008/0129549 A1 | 6/2008 | Farkas et al. | |
| 2010/0198480 A1* | 8/2010 | Mertens et al. | 701/100 |

FOREIGN PATENT DOCUMENTS

| | | |
|---|---|---|
| DE | 10 2007 013 551 A1 | 9/2008 |
| EP | 2 072 737 A2 | 6/2009 |
| JP | 2001-79014 A | 3/2001 |

* cited by examiner

*Primary Examiner* — Erick Glass
(74) *Attorney, Agent, or Firm* — Maginot, Moore & Beck LLP

(57) ABSTRACT

A method for checking a speed system of a motor-driven apparatus is proposed. In the absence of a speed signal, a first aspect provides for a control device to send a test signal via the speed system, the test signal being expected at an input of the control device. If the test signal is not detected, a fault in the speed system is identified.

15 Claims, 1 Drawing Sheet

METHOD AND APPARATUS FOR CHECKING A SPEED SYSTEM OF A MOTOR-DRIVEN APPARATUS

This application claims priority under 35 U.S.C. §119 to patent application no. DE 10 2012 205 973.3, filed on Apr. 12, 2012 in Germany, the disclosure of which is incorporated herein by reference in its entirety.

BACKGROUND

The present disclosure relates to a method for checking a speed system of a motor-driven apparatus. The disclosure also relates to an apparatus for checking a speed system of a motor-driven apparatus.

Various methods for recording and checking a speed of motor-driven apparatuses are known in the prior art.

SUMMARY

An object of the disclosure is to provide an improved method for checking a speed system of a motor-driven apparatus.

The object is achieved with a method for checking a speed system of a motor-driven apparatus, including:
a) checking whether a speed signal is applied to a first input of a control device;
b) outputting a test signal at an output of the control device to the speed system if no speed signal is applied in a), and, if the output test signal is not sensed at the first input of the control device,
c) identifying a fault in the speed system.

An advantage of the method according to the disclosure is that, in the absence of a speed signal from the motor-driven apparatus, it is possible to determine whether there is a defect in the speed system. The method can advantageously be used whenever it is not clear what the reasons are for the absence of the speed signal.

According to another aspect of the disclosure, the object is achieved with a method for checking a speed system of a motor-driven apparatus, including:
a) switching on the apparatus;
b) detecting a motor current signal from the apparatus;
c) detecting a speed signal at a second input of a control device, and, if no speed signal is detected and the motor current signal detected in b) undershoots a defined level,
d) identifying a fault in the speed system.

An advantage of this method is that existing inputs of the control device are used to evaluate a motor current signal. A fault in the speed system is identified only if there is no speed signal and a level of the motor current undershoots a defined value.

According to another aspect of the disclosure, the object is achieved by means of a method for checking a speed system of a motor-driven apparatus, including:
a) switching on the apparatus;
b) recording a speed value of the apparatus, and, if a defined speed value has not been reached after a defined time,
c) identifying a fault in the apparatus.

An advantage of this method is that a check is carried out, in a so-called "soft start phase" of the motor-driven apparatus, in order to determine whether the motor-driven apparatus has reached a defined speed after a defined time. If this is not the case, a fault in the apparatus is identified.

According to another aspect of the disclosure, the object is achieved by means of a method for checking a speed system of a motor-driven apparatus, including:
a) recording a speed of the apparatus, and, if a defined speed is not recorded after a defined operating time of the apparatus,
b) identifying a fault in the apparatus.

This advantageously makes it possible to check, during regular operation of the apparatus, whether the speed system is operating properly.

According to another aspect, the object is achieved with an apparatus for checking a speed system of a motor-driven apparatus, having a control device which has an output which can be used to send a test signal to the speed system if a speed signal is not detected at a first input of the control device, a fault in the speed system being identified if the output test signal is not sensed at the first input of the control device.

One preferred embodiment of the method according to the disclosure provides for the location and/or the type of fault in the apparatus and/or in the speed system to be determined in a further step. Fault diagnosis is advantageously carried out in this manner. This makes it easier for a service area, for example, to quickly and efficiently locate and eliminate the fault.

One advantageous development of the method provides for determining whether there is a fault in the speed transmitter and/or whether there is a fault in the speed recording device. As a result, extended diagnosis of the fault is advantageously carried out.

The disclosure is described in more detail below using figures. In this case, all described or illustrated features, separately or in any desired combination, form the subject matter of the disclosure irrespective of their combination in the patent claims or their back-reference and irrespective of their wording and illustration in the description and in the figures. The figures are primarily intended to illustrate the principles which are essential to the disclosure.

BRIEF DESCRIPTION OF THE DRAWINGS

In the figures.

DETAILED DESCRIPTION

Figure 1A:
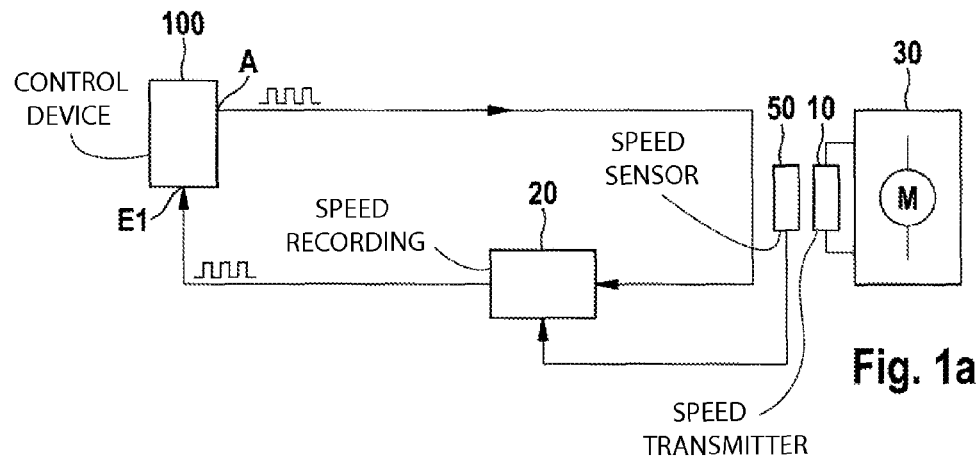
FIG. 1a shows a basic illustration of a type of embodiment of the method according to the disclosure.

FIG. 1a shows, in a highly simplified form, one possibility for carrying out the method according to the disclosure. A control device 100 has a first input E1 and an output A. A test sequence or a test signal is output via the output A if a speed signal from a motor-driven apparatus 30 is not sensed at the first input E1. In this case, the output A can be connected as an output only while outputting the test signal; otherwise, it may be an open-collector connection or an input of the control device 100. The speed signal is passed via a speed recording device 20 which records, digitizes, filters etc. a speed of the motor-driven apparatus 30.

Examples of motor-driven apparatuses 30 are any types of power tools, washing machines etc. in which a variable speed is generally recorded and monitored. If the speed signal is not applied to the first input E1, a test signal, preferably an alternating signal (for example a pulse-width-modulated signal), is sent to the control device 100 via the speed recording device 20. As a result, the output test sequence is expected to be present at the first input E1 of the control device 100 in a defined manner (for example in an identical or inverted manner), depending on the type of processing of the test signal in the speed recording device 20. If this is not the case, a fault in the speed recording device 20 is identified and corresponding actions are initiated.

Figure 1B:
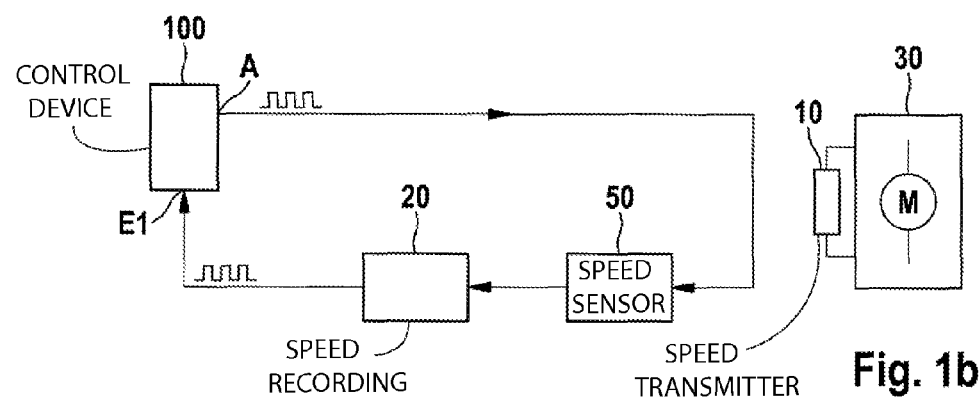
FIG. 1b shows a basic illustration of another type of embodiment of the method according to the disclosure.

FIG. 1b shows a modified possibility for carrying out the method according to the disclosure. It can be seen that the test signal is now additionally passed via a speed sensor 50 in order to also check the functionality of the speed sensor 50. The speed transmitter may be, for example, in the form of a magnet wheel which is pressed onto an armature shaft of an electric motor of the motor-driven apparatus 30. The method of operation is otherwise the same as that described above with reference to FIG. 1a.

Figure 2:
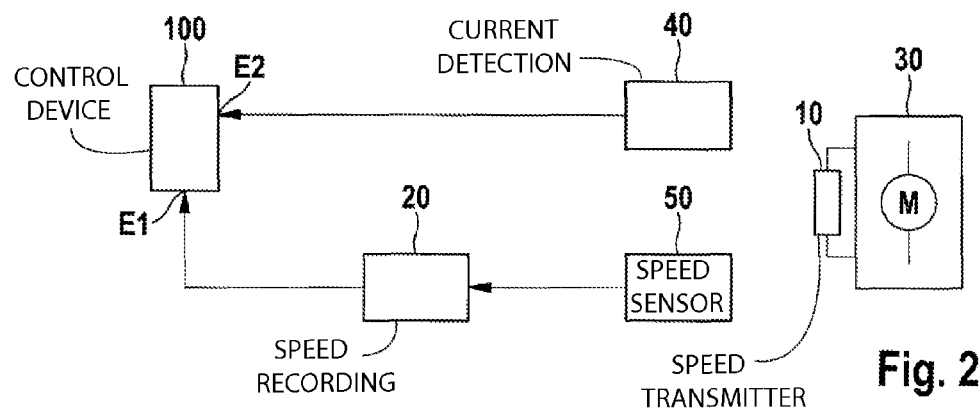
FIG. 2 shows a basic illustration of another type of embodiment of the method according to the disclosure.

FIG. 2 shows an alternative possibility for a method for checking a speed system of a motor-driven apparatus 30. A motor current detection device 40 is used to detect a motor current signal from the motor-driven apparatus 30 (for example via a current measuring resistor). Said signal is read in at a second input E2 of the control device 100. At the same time, a speed of the motor-driven apparatus 30 is recorded and is read in at the first input E1 of the control device 100 using the speed sensor 50 and the speed recording device 20.

If no speed is recorded at the first input E1 of the control device 100 and a value of the motor current undershoots a particular level, a fault in the motor-driven apparatus 30 is identified. For example, this may be caused by a blockage in the motor-driven apparatus 30, in the case of which the apparatus 30 is mechanically blocked by external influences and a motor current may be exceptionally large. It is thus advantageously possible to distinguish whether there is actually a blockage in the motor-driven apparatus 30 or a fault in the speed system 10, 20, 50. Depending on the fault, it is then possible to take suitable actions to eliminate the fault.

A further modification of the method according to the disclosure involves checking, in a so-called "soft start phase" of the motor-driven apparatus 30 in which the motor-driven apparatus 30 is slowly brought to the desired speed, whether a predefined speed has been reached within a defined period of time. The speed can be regulated or controlled in this case, for example, using phase gating control or using a PWM (pulse-width-modulated) signal. A fault is identified if the speed has not been reached.

A further modification of the method according to the disclosure involves checking a speed value, for example at regular intervals of time, in a regular operating phase of the motor-driven apparatus 30. A fault is identified if the speed value is not reached or is only partially reached.

The fault in the speed system may therefore result, for example, in the speed sensor 50 and/or the speed transmitter 10 being incorrectly positioned inside the motor-driven apparatus 30 or being defective. This causes distortion or absence of the speed signals, which is forwarded by the speed recording device 20 and is identified as a fault in the speed system using the method according to the disclosure.

Furthermore, the fault may also be caused by wiring faults in the speed sensor 50 or the speed recording device 20.

The control device 100 may be in the form of a microcontroller, for example. The method according to the disclosure can thus be advantageously implemented in the form of a software program for the microcontroller. Furthermore, the method according to the disclosure may also be stored on computer-readable data storage media and may thus be implemented or carried out in a simple manner on different control devices 100.

No additional effort at all or only very little additional effort is advantageously needed to carry out the method according to the disclosure. In particular, an additional test output should be provided on the control device 100, to which output a test line is connected which is used to transmit said test signal or the test sequence.

It goes without saying that said aspects of the disclosure can be combined with one another in any desired manner, with the result that a test-signal-based approach and/or an analysis-based approach of the method according to the disclosure can rather be used depending on the requirement and the application. If a combination of the abovementioned approach is implemented, it is advantageously possible to distinguish, depending on the type of fault, whether the speed signal transmitter or the speed signal receiver is defective.

In summary, the disclosure proposes a method for checking a speed system ("tacho system") and the motor-driven apparatus of a motor-driven apparatus, which method can be used to change the speed system to a safe and defined state. The method makes it possible for a service or customer service area, for example, to carry out deliberate actions to eliminate faults in the speed system. The method according to the disclosure can be advantageously carried out in products having universal motors or electric motors with an armature/rotor in which the speed is recorded using electronics.

A person skilled in the art will be able to modify or combine the features of the disclosure in a suitable manner without departing from the essence of the disclosure.

What is claimed is:

1. A method for checking a speed system of a motor-driven apparatus, comprising:
   checking, with a control device, whether a speed signal generated by a speed sensor of the speed system is applied to a first input of the control device;
   outputting a test signal at an output of the control device to the speed system if the control device determines that the speed signal is not applied to the first input of the control device; and
   identifying a fault in the speed system, with the control device, if the outputted test signal is not sensed at the first input of the control device.

2. The method according to claim 1 further comprising:
   switching on the apparatus;
   detecting a motor current signal from the motor-driven apparatus with a motor current detection device of the speed system having an output electrically connected to a second input of the control device; and
   identifying the fault in the speed system, with the control device, if (i) the speed signal is not applied to the first input of the control device, and (ii) the motor current signal undershoots a defined level of motor current.

3. The method according to claim 1 further comprising:
   recording a speed value of the motor-driven apparatus with a speed recording device of the speed system; and
   identifying a fault in the motor-driven apparatus, with the control device, if a defined speed value of the motor-driven apparatus has not been reached after a defined time.

4. The method according to claim 3, further comprising:
   determining, with the control device, at least one of (i) a location of the fault in the speed system, (ii) a type of the fault in the speed system, (iii) a location of the fault in the motor-driven apparatus, and (iv) a type of the fault in the motor-driven apparatus.

5. The method according to claim 4, further comprising:
   determining, with the control device, whether the fault in the speed system is in at least one of (i) a speed transmitter of the speed system, (ii) the speed recording device of the speed system, and (iii) the speed sensor of the speed system.

6. The method according to claim 3, further comprising:
identifying the fault in the motor-driven apparatus, with the control device, if the defined speed value of the motor-driven apparatus is not recorded by the speed recording device after a defined operating time of the motor-driven apparatus.

7. The method according to claim 1 further comprising:
switching on the motor-driven apparatus;
recording a speed value of the motor-driven apparatus with a speed recording device of the speed system; and
identifying a fault in the motor-driven apparatus if a defined speed value of the motor-driven apparatus has not been reached after a defined time.

8. The method according to claim 1 further comprising:
recording a speed value of the motor-driven apparatus with a speed recording device of the speed system; and
identifying a fault in the motor-driven apparatus if a defined speed value of the motor-driven apparatus is not recorded by the speed recording device after a defined operating time of the motor-driven apparatus.

9. The method according to claim 1, wherein a computer program product includes a program code configured to carry out the method when the program code is (i) run on an electronic control device or (ii) is stored on a computer-readable data storage medium.

10. The method according to claim 1, wherein an apparatus configured to check the speed system of the motor-driven apparatus includes the control device having the first input and the output.

11. A method for checking a speed system of a motor-driven apparatus, comprising:
switching on the motor-driven apparatus;
detecting a motor current signal from the motor-driven apparatus with a motor current detection device of the speed system;
detecting, with a control device, a speed signal generated by a speed sensor of the speed system at a first input of the control device;
identifying a fault in the speed system if (i) the speed signal is not detected by the control device, and (ii) the control device determines that the motor current signal undershoots a defined level of motor current.

12. The method according to claim 11 further comprising:
recording a speed value of the motor-driven apparatus with a speed recording device of the speed system; and
identifying a fault in the motor-driven apparatus if a defined speed value of the motor-driven apparatus has not been reached after a defined time.

13. The method according to claim 11 further comprising:
recording a speed of the motor-driven apparatus with a speed recording device of the speed system; and
identifying a fault in the motor-driven apparatus if a defined speed is not recorded by the speed recording device after a defined operating time of the motor-driven apparatus.

14. A method for checking a speed system of a motor-driven apparatus, comprising:
checking, with a control device, whether a speed signal generated by a speed sensor of the speed system is applied to a first input of the control device;
outputting a test signal at an output of the control device to the speed system if the control device determines that the speed signal is not applied to the first input of the control device;
identifying a fault in the speed system, with the control device, if the outputted test signal is not sensed at the first input of the control device;
recording a speed value of the motor-driven apparatus with a speed recording device of the speed system; and
identifying a fault in the motor-driven apparatus, with the control device, if a defined speed value of the motor-driven apparatus has not been reached after a defined time.

15. The method according to claim 14, further comprising:
identifying the fault in the motor-driven apparatus, with the control device, if the defined speed value of the motor-driven apparatus is not recorded by the speed recording device after a defined operating time of the motor-driven apparatus.

* * * * *